Figures 2, 3, 4:
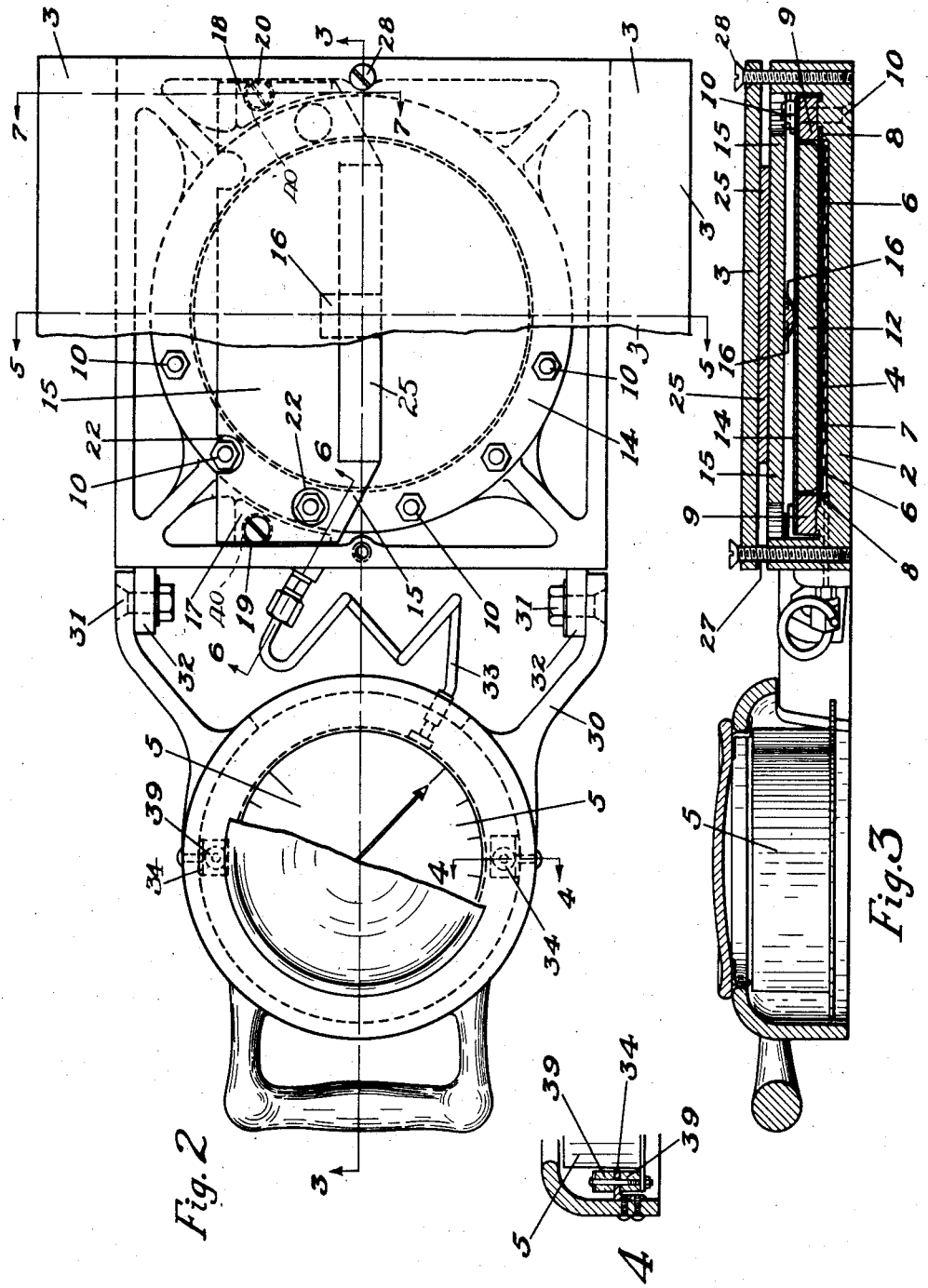

Jan. 1, 1924
H. C. BERRY
SCALE
Filed May 15, 1922
1,479,581
2 Sheets-Sheet 1
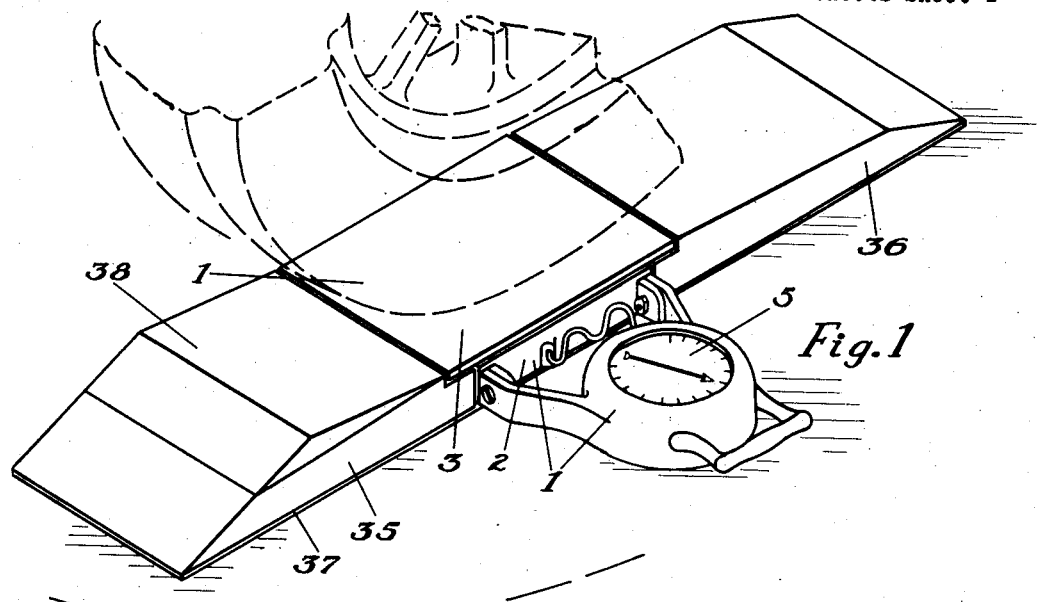
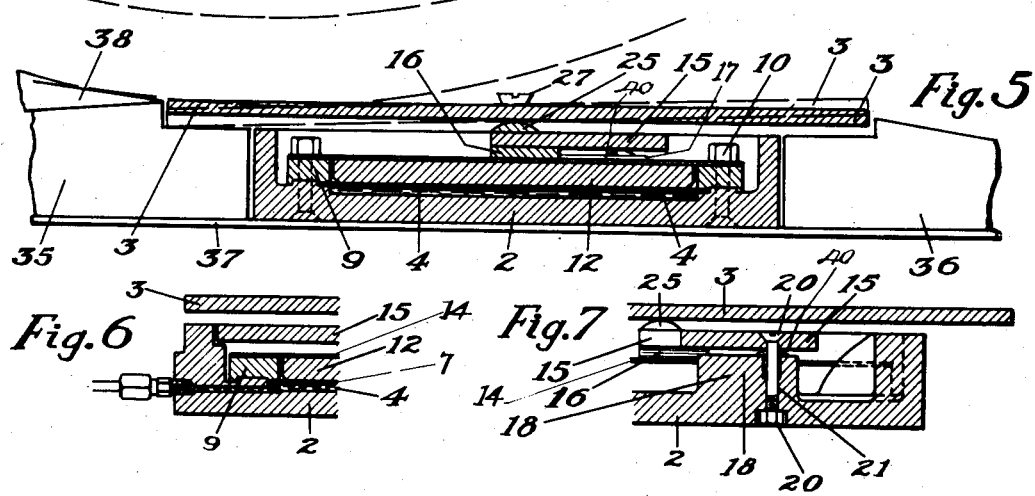
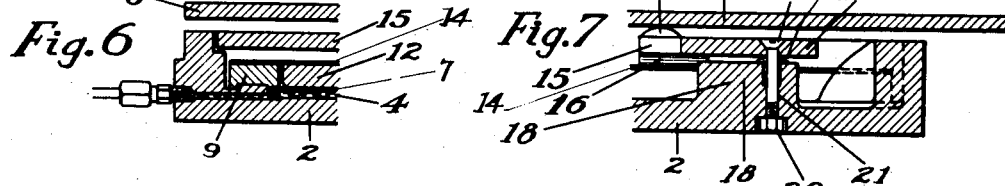
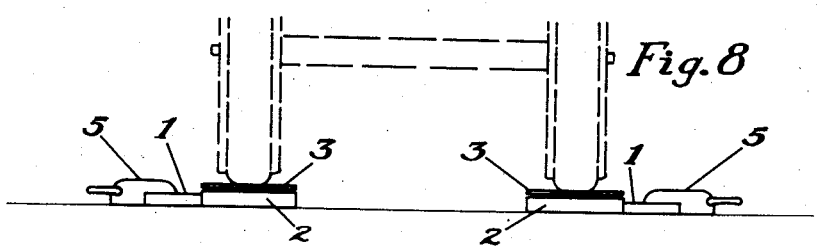
Inventor:
Herman Claude Berry
By F. DeWitt Goodwin
Attorney Jan. 1, 1924

H. C. BERRY

SCALE

Filed May 15, 1922

1,479,581

2 Sheets-Sheet 2

Inventor:
Herman Claude Berry
By DeWitt Goodwin
Attorney

Patented Jan. 1, 1924.

1,479,581

UNITED STATES PATENT OFFICE.

HERMAN CLAUDE BERRY, OF LANSDOWNE, PENNSYLVANIA.

SCALE.

Application filed May 15, 1922. Serial No. 561,096.

*To all whom it may concern:*

Be it known that I, HERMAN CLAUDE BERRY, a citizen of the United States, residing at Lansdowne, in the county of Delaware and State of Pennsylvania, have invented certain new and useful Improvements in Scales, of which the following is a specification.

My invention relates to improvements in scales, and particularly relates to a portable hydraulic device for weighing trucks and adapted to meet the same requirements as were described in my application for Letters Patent, Serial Number 483,388, filed July 9th, 1921.

The object of my invention is to use a hydraulic pressure cell in combination with a tilting platform by which the weight of a wheel of a truck may be ascertained as the wheel passes over the platform; a further object of my invention is to provide a device for ascertaining the weight of a wheel without requiring the wheel to pass over the exact center of the pressure cell, comprising a torque plate for supporting the tilting platform and bearing upon the pressure cell and upon two points of the base; a still further object of my invention is to construct a scale of the portable type in which the number of parts and the weight of the same are reduced to a minimum, and the use of calibrated coiled springs is avoided.

Referring to the accompanying drawings; Fig. 1, is a perspective view of my improved scale, showing a wheel in dotted line passing over the scale; Fig. 2 is a plan view of the scale, showing a portion of the platform broken away; Fig. 3, is a longitudinal vertical sectional view on line 3—3 Fig 2; Fig. 4 is a vertical sectional view on line 4—4 Fig. 2; Fig. 5, is a transverse vertical section on line 5—5 Fig. 2; Fig. 6 is a vertical sectional view on line 6—6 Fig. 2; Fig. 7 is a vertical sectional view on line 7—7 Fig. 2; and Fig. 8 is a diagram showing a truck, in end view, with opposite wheels passing over two scales.

Referring to the accompanying drawings, in which like reference characters refer to like parts, 1 represents the scale, comprising a base 2; a platform 3 mounted above the base and adapted to tilt when a load passes over the same; a hydraulic pressure cell 4 interposed between the base 2 and the platform 3 and connected with a gauge 5, for showing weight of the load upon the platform 3, at the moment of the tilting of the latter.

The base 2 is preferably of rectangular formation and is adapted to rest upon the ground or upon a plate connecting the approaches located at opposite sides of the base, hereinafter more fully described. Said base 2 is provided with a depression formed in the upper surface thereof, forming a circular chamber 6, adapted to contain oil, or other liquid. A diaphragm 7, of thin flexible metal, is secured above the said chamber 6 and the edge of the diaphragm 7 is clamped upon the facing surface 8, formed upon the base 2, by a clamp ring 9, secured to the base by bolts 10.

A plate, or disk 12, of rigid formation, is mounted above the diaphragm 7 and rests upon the latter. Said plate 12 fits loosely within the cylindrical wall of the clamp ring 9 and is free to move vertically and float upon the pressure cell 4, formed by the liquid contained in the said chamber 6, and the said parts confining the liquid within said chamber. The plate 12 is covered by a sheet of flexible material 14, secured upon the clamp ring 9 by the bolts 10. Said sheet 14 prevents the admission of any dirt around the plate 12 which would interfere with the free movement of the said plate.

A torque plate 15 is mounted above the pressure cell 4 and has a bearing point 16 near one edge thereof, which rests upon the center of the floating plate 12, and upon which bearing point 16 the torque plate is free to rock. The opposite edge of the torque plate 15 is clamped upon lugs 17 and 18 forming part of the base 2. Said lugs are located adjacent to the opposite ends of the torque plate 15 and the torque plate is clamped upon the lugs 17 and 18 by bolts 19 and 20 which pass through apertures 21 formed through the lugs 17 and 18. Said apertures being of larger diameter than the diameter of the bolt throughout the upper portion of the lugs, to relieve the bolts sufficiently to permit the torque plate 15 to turn upon the washers 40 and permit the opposite edge of the torque plate, carrying the bearing point 16, to move vertically with the floating plate 12. The torque plate 15 is also provided with clearance holes 22 for the heads of the bolts 10, so that the latter will not interfere with the movements of the plate 15.

The platform 3 is mounted above the torque plate 15 and rests upon the elongated cylindrical bearing surface 25, formed, or secured, upon the upper surface of the torque plate 15, and positioned so that its axis will extend at right angles to the line of travel of the wheel of a truck passing over the platform. The platform 3 is loosely held upon the upstanding walls of the base 2 by bolts 27 and 28, positioned in alignment with the axis upon which the platform tilts upon the torque plate 15.

A frame 30 is provided upon the base 2, in which is secured the hydraulic gauge 5, preferably a Bourdon gauge, a well known type now in general use. Said frame 30 is hinged to the base 2 on the bolts 31 passing through lugs 32 formed upon the base, thus allowing the frame 30 to tilt when the scale is resting upon uneven ground. The gauge 5 is connected to the pressure cell 4 by a flexible pipe 33. The gauge 5 is supported upon the frame 30 by means of brackets 34 provided with cushion blocks 39 of rubber, or other suitable material. The gauge 5 is provided with a maximum reading hand.

Inclined approaches 35 and 36 are provided over which to drive the wheel of a truck onto the tilting platform 3. Said approaches are positioned upon opposite sides of the base 2 and may be connected to each other by a plate 37 which extends under the base 2.

A wedge 38 is provided for raising the wheel higher than the platform 3. Said wedge 38 is adapted to be placed in front of the wheel on top of the approach and enables the truck to run freely over the platform 3 with the clutch released, thus avoiding the effects of vibration caused by the engine when coupled with the traction wheel.

The operation of my invention is as follows:—The wheel of a truck, which is to be weighed, first tilts the platform 3 into the position shown in dotted lines Fig. 5, and when the wheel reaches the center of the platform 3 the latter will be entirely supported upon the torque plate 15 which transmits all the weight to the pressure cell 4 and the gauge 5 will show the exact weight of the wheel as it passes over the scale and the combined weight of all the wheels will show the weight of the truck. Two scales may be used on opposite sides of the truck as shown in Fig. 8, if desired. When the wheel of the truck passes over the scale on one side of the center line of the tilting platform 3, the path of the wheel being eccentric to the pressure cell 4, the torque plate 15 will act to produce a vertical force on the floating plate 12 equal to the weight of the wheel; the effect of the eccentricity being provided for by the two points of the contact between the torque plate 15 and the base 2. After the passage of the truck, the maximum weight of the truck will be indicated by the maximum hand of the gauge.

Having thus described my invention, I claim and desire to secure by Letters Patent:—

1. A scale comprising a base, a platform mounted above the base, a hydraulic pressure cell interposed between the base and the platform upon which the platform is tiltably supported, and a gauge associated with the pressure cell for indicating the weight of a load passing over the platform.

2. A scale comprising a base, a platform loosely mounted upon the base, a hydraulic pressure cell mounted upon the base, a fulcrum positioned between the platform and the pressure cell upon which fulcrum the platform may tilt, and a gauge associated with the pressure cell for indicating the weight of a load passing over the tilting platform.

3. A scale comprising a base, a platform loosely mounted upon the base, a hydraulic pressure cell mounted upon the base, a rigid plate adapted to float upon the pressure cell, a fulcrum member positioned between the platform and said rigid plate upon which fulcrum member the platform may tilt, and a gauge for indicating the weight of a load passing over the tilting platform.

4. A scale comprising a base having a chamber formed therein adapted to contain a liquid, a flexible diaphragm secured upon the base for encasing the said chamber and forming a pressure cell, a floating plate adapted to rest upon the diaphragm, a torque plate mounted upon the base above the said floating plate, a platform loosely mounted upon the base above the torque plate, a fulcrum member positioned between the platform and the torque plate upon which the platform may tilt, a fulcrum member positioned between the torque plate and the floating plate, and an indicating device connected with the pressure cell for showing the weight of the load upon the platform.

5. A scale comprising a base having a chamber formed therein, adapted to contain a liquid, a flexible diaphragm, a clamp member adapted to secure the diaphragm upon the base and form the said chamber into a pressure cell, a plate adapted to rest upon the said diaphragm, a torque plate having one edge thereof supported upon the base, said torque plate having a bearing point upon the opposite edge thereof adapted to rest upon the center of said plate resting upon the diaphragm, a platform loosely positioned upon the base, a fulcrum member positioned between the platform and the torque plate and an indicating device connected with the pressure cell for showing the weight of a load upon the platform.

6. A scale comprising a base, a hydraulic pressure cell mounted upon the base, a plate of rigid construction supported upon the pressure cell, a torque member having a point of support upon the center of said plate and two points of support upon the base positioned in triangular relation to each other, a platform positioned above said torque member, said platform having a bearing axis upon the torque member above the center of the pressure cell, and a gauge associated with the pressure cell for showing the weight of a load upon the platform.

7. A scale comprising a base, a tilting platform mounted above the base, a hydraulic pressure cell interposed between the base and the platform, a frame pivotally mounted upon one side of the base, a gauge secured within said frame and a flexible pipe connecting the pressure cell and the gauge.

8. A scale adapted for weighing the wheel of a truck as it passes over the platform of the scale, an approach adapted to be placed adjacent to the scale over which the wheel may pass towards the scale, said approach having a portion of greater elevation than the platform of the scale, and said elevated portion having a surface inclined downwardly towards the platform of the scale whereby the wheel will drift over the scale platform.

In testimony whereof I affix my signature.

HERMAN CLAUDE BERRY.